United States Patent [19]
Fritze et al.

[11] 4,372,997
[45] Feb. 8, 1983

[54] HEAT- AND FLAME-RESISTANT SHEET MATERIAL

[75] Inventors: Gary D. Fritze, Hastings; Joseph Graham, Oakdale, both of Minn.

[73] Assignee: Minnesota Mining and Manufacturing Company, St. Paul, Minn.

[21] Appl. No.: 366,822

[22] Filed: Apr. 9, 1982

[51] Int. Cl.³ .................... B32B 11/02; B32B 11/08
[52] U.S. Cl. .................... 428/144; 428/149; 428/240; 428/241; 428/251; 428/256; 428/285; 428/297; 428/298; 428/323; 428/325; 428/329; 428/331; 428/468; 428/489; 428/920; 428/921
[58] Field of Search ............ 428/144, 149, 240, 251, 428/246, 256, 285, 297, 298, 303, 323, 325, 329, 331, 468, 489, 920, 921

[56] References Cited
U.S. PATENT DOCUMENTS

4,218,502  8/1980  Graham ........................ 428/144
4,234,639  11/1980  Graham et al. ............... 428/144

FOREIGN PATENT DOCUMENTS

1300937  12/1972  United Kingdom.
1457999  12/1976  United Kingdom.

Primary Examiner—James J. Bell
Attorney, Agent, or Firm—C. Alexander; D. M. Sell; R. R. Tamte

[57] ABSTRACT

Fire- and heat-resistant sheet material comprises fibrous webs adhered together with asphalt which is filled with inorganic particles, intumescable granules, and a catalyst which catalyzes charring of the asphalt.

14 Claims, 2 Drawing Figures

HEAT- AND FLAME-RESISTANT SHEET MATERIAL

Sheet materials that provide a barrier to heat and flame are needed in several structural applications to protect underlying portions of the structure and increase resistance to heat and fire. One product commercially marketed for this purpose comprises a web made from glass roving and coated with sodium silicate which intumesces when heated. However, the product exhibits only limited intumescence and is rather expensive, which has prevented broad acceptance of the product.

The present invention provides a new fire- and heat-resistant sheet material, which briefly comprises at least two fibrous webs formed from a material that does not ignite or soften at temperatures lower than about 150° C.;

asphalt disposed between, impregnated in, and adhering the fibrous webs together;
 inorganic filler particles dispersed in the asphalt in a volume ratio between about 1:10 and 1:1 particles to asphalt;
 intumescable granules comprising hydrated soluble silicate glass dispersed in the asphalt in an amount of at least about 5 volume-parts per 100 parts of asphalt; and
 iron- and halogen-containing material dispersed in the asphalt and which catalyzes the charring of asphalt upon heating of the asphalt to 175° C. or more.

Surprisingly, although all of the listed components of the new sheet material except the inorganic filler melt or ignite at temperatures lower than 2000° F. (1100° C.), the composite provides a useful heat barrier at such temperatures and higher. At a temperature of about 400° F. (or about 200° C.), the composite expands and a foamed carbonaceous char is formed which provides increased heat insulation and flame resistance. The composite will withstand flames directed at it for hours and will exhibit low spread of flame and produce a low amount of smoke.

DETAILED DESCRIPTION

Figure 1:
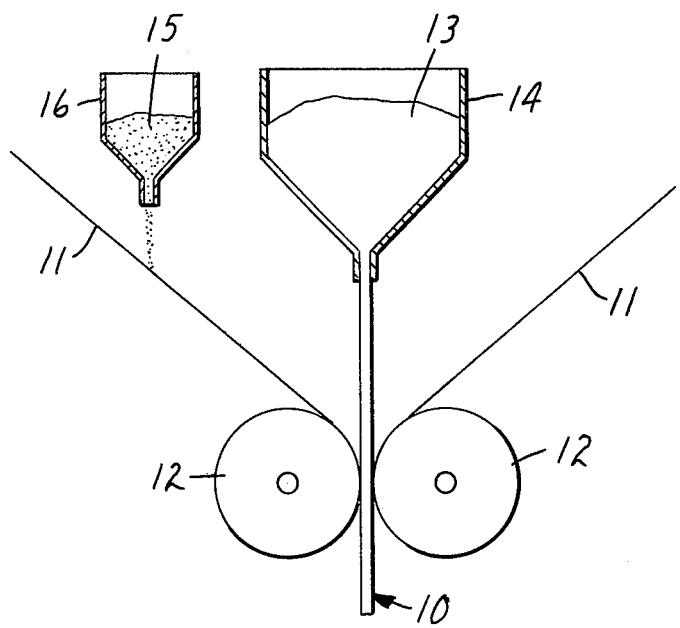
FIG. 1 is a schematic diagram of apparatus useful for preparing sheet material of the invention.
Figure 2:
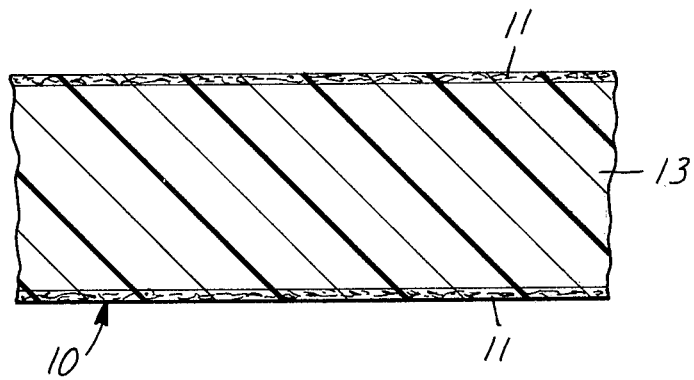
FIG. 2 is an enlarged sectional view through sheet material of the invention.

As shown by the illustrative apparatus diagrammed in FIG. 1, sheet material 10 of the invention can be made by feeding two fibrous webs 11 together through nip rolls 12, introducing into the nip of the rolls a mixture 13 of molten asphalt and inorganic filler particles from a hopper 14, and cascading catalyst-coated intumescable granules 15 into the asphalt or onto the web from a hopper 16. The asphalt binds the two fibrous webs together and at least partially impregnates the webs, and when the asphalt hardens, a unitary sheet material 10 is formed.

The fibrous webs 11 preferably comprise glass fiber mats. Such mats typically include fibers having an average diameter between about 1 and 50 micrometers, and range between about ½ and 2 millimeters in thickness. The mat is preferably a nonwoven coherent mass of entangled fibers impregnated with resin, but mats woven from glass yarns or roving may also be used. Instead of glass fiber mats, screens woven from metal wire or filaments have also proved useful and are regarded herein as a fibrous web. A principal function of the fibrous web is to keep the asphalt from flowing freely during exposure to a flame, and a metal wire screen achieves such a purpose. Webs of ceramic or other inorganic fibers may also be used, as may webs of any fibers which do not ignite or soften at temperatures lower than about 150° C.

Various grades of asphalt are useful in sheet material of the invention (bitumen or pitch may be used instead of or together with asphalt, and unless otherwise specified, the term "asphalt" includes such materials). Asphalts having a ring-and-ball softening point between 180° and 250° are most typically used.

Inorganic filler particles, such as calcium carbonate (or limestone), zirconium oxide, clay, and titanium dioxide (which adds heat-reflective properties) are dispersed in the asphalt generally in a volume ratio of at least about 1 part particles per 10 parts of asphalt. When such filler particles are omitted the heat- and flame-resistance of the sheet material is greatly reduced. In order to include sufficient asphalt to serve a binding function in the sheet material and to provide asphalt for the carbonaceous char that forms in the presence of heat or flame, the filler particles generally are present in an amount up to a volume ratio of about 1 part particles per 1 part of asphalt. Preferably there are between about 2 and 5 volume-parts of particles per 10 parts of asphalt.

The preferred intumescable granules in the sheet material are hydrated soluble silicate glass particles as described in Graham et al, U.S. Pat. No. 4,218,502, and especially the forms of such particles described in Graham, U.S. Pat. No. 4,234,639, which carry a coating of material that catalyzes the charring of asphalt. As taught in those patents, which are incorporated herein by reference, the granules preferably also carry a protective moisture-resistant coating which includes an ingredient that is ionized in the presence of water to provide metal cation capable of reacting with the silicate ion of the core particle. The metal cation and silicate ion form a reaction product that is less water-soluble than the silicate glass of the particle, thereby limiting action of water on the core particle. The granules are generally between about 0.1 and 1 millimeter in diameter, and should intumesce at least 10 times their original volume and preferably at least 25 times their original size. They are generally included in the asphalt in an amount of at least about 5 volume-parts, preferably at least 10 and more preferably at least 20 volume-parts, per 100 parts of asphalt to achieve desired intumescence. Other intumescable granules such as vermiculite may be used instead of or in addition to the soluble silicate granules.

The catalytic coating on the granules described in U.S. Pat. No. 4,234,639 comprises a hologenated organic compound such as halogenated paraffin which releases halogen when heated to a temperature less than about 350° F. (175° C.). The halogen constitutes a substantial proportion, generally at least 40 weight-percent, of the halogenated compound. Instead of halogenated paraffin, an unstable form of polyvinyl chloride or polyvinylidene chloride may be used (instability can be achieved by omission of conventional stabilizers or by inclusion of materials like zinc compounds which promote decomposition).

The halogenated compounds can be coated on the soluble silicate granules from a solution or dispersion of the compounds, or liquid forms of the compounds may be coated onto the particles. Alternatively, the core particles may be coated with a binder material such as polyethylene or asphalt, and while the binder material is tacky as by heating, tumbled in halogenated compound. The latter becomes coated on the binder material and may in fact dissolve into the binder material.

The preferred iron-containing compounds for inclusion in the catalytic coating on the granules are iron oxide particles, i.e., particles of FeO, $Fe_2O_3$ or $Fe_3O_4$.

Iron-containing particles can be incorporated into the catalytic coating on the granules by incorporating them in the halogenated compound or some other binder material coated on the particles, or by tumbling a tacky-coated core particle in a bed of the particles. The particles become adhered and partially or fully embedded in the coating; and a surface layer is typically formed which detackifies the granule.

Other useful iron-containing compounds include iron salts of a fatty acid such as stearic or oleic acid. In one embodiment, such compounds are formed in situ on the granules by applying a coating of the molten acid on the particles and tumbling the coated particles in a bed of iron oxide particles, which become embedded in the coating and react to form the iron salt. Thereafter the particles may be coated with a halogenated compound such as chlorinated paraffin, and if desired, additional iron oxide particles can be coated on the exterior as a detackifier. Other useful iron-containing compounds may generally be chosen by heating a mixture of asphalt, chlorinated paraffin and the candidate material for one hour at 350° F. (175° C.); if the ring-and-ball softening point of the mixture is significantly higher after this test than the ring-and-ball softening point for the asphalt itself, the iron-containing compound will generally produce a useful catalytic effect in granules of the invention.

Instead of being coated on the intumescable granules, the catalytic material may be dispersed in the asphalt binder material in the sheet material. For example, granules of halogenated compound carrying a coating of iron-containing particles may be mixed into the asphalt prior to introduction of the asphalt into the nip of the rollers shown in FIG. 1 or by cascading the granules through an additional hopper such as the hopper 16 in FIG. 1. Also, while it is preferable to have the halogen and iron present in separate compounds to minimize premature catalysis of the asphalt (as described in the previously noted U.S. Pat. No. 4,234,639), the halogen and iron may be present in sheet material of the invention in the form of a single compound such as ferric chloride.

Halogenated compound should be included in sheet material of the invention in an amount of at least 0.1 weight-part per 100 parts of asphalt. Sufficient iron-containing compound is included to react with the released halogen to form catalytic iron halide and also in some cases to detackify the coated intumescable granules. Usually at least 0.1 weight-part of iron oxide is also used per 100 weight parts of asphalt.

Sheet material of the invention may be used by itself or assembled or laminated with other products. For example, it may be laminated to rigid cellular foams, e.g., polyisocyanurate, polyurethane and polystyrene foams such as used in building walls and on commercial roofs. Also sheet material of the invention may be pre-expanded, yielding a flame-resistant insulative panel. Sheet material of the invention can be laminated or otherwise assembled with gypsum board or perlite board to protect extremely flammable material such as polystyrene foam. Films of polyethylene terephthalate, poly(vinylidene fluoride), polyethylene, polypropylene, or aluminum foil may be laminated to the sheet material to provide a moisture barrier. Where insulation against ambient heat is not critical, such as in fire doors, safes, or file cabinets, the sheet material will often be used by itself. Sheet material of the invention may also be applied around structural steel or wood as a protection against heat or flame.

The invention will be further illustrated by the following example. Eight pounds of asphalt having a ring-and-ball softening point of 210° F. was heated to 375° F. Intumescable granules as described in U.S. Pat. No. 4,234,639 were prepared using core particles of hydrated sodium silicate glass having a $SiO_2:Na_2O$ ratio of 3.22 to 1, having a water content of about 10 weight-percent, ranging between about 119 and 297 micrometers in diameter, and being capable of expanding about 30-fold upon heating to 400° C. The core particles were coated with chlorinated paraffin containing approximately 70 weight-percent chlorine (supplied by Diamond Shamrock Corporation) in an amount of 7.5 parts per 100 parts of the core particles, and were further coated on their exterior surface in an amount of about 25 parts per 100 parts of the core particles with $Fe_2O_3$ particles having a diameter of about 75 micrometers or less. Four pounds of the coated intumescable granules were heated to 200° F., and together with eight pounds of calcium carbonate particles passed through a 100-mesh U.S. Standard Screen (149-micrometers), were mixed into the molten asphalt using an air-driven propeller mixer in a 5-gallon pail equipped with a jacket heater. This asphalt mixture was knife-coated onto a mat of glass fibers weighing three pounds per 100 square feet (supplied by Johns Manville) producing a coated web having an overall thickness of 0.090 inch (2.3 millimeters). Strips of this coated web 3 feet by 1 foot were heated in an oven at 250° F. for ten minutes, after which a layer of the uncoated glass fiber mat was pressed into the asphalt coating, yielding sheet material of the invention having an overall thickness of about 0.090 inch (2.3 millimeters).

The prepared sheet material was then held 1 to 2 inches above a Meeker burner flame, whereupon it intumesced and a foamed carbonaceous char formed. The sheet material continued to be held in position over the flame for one hour, and remained intact as an integral sheet. By contrast, if individual components are subjected to such conditions, the uncoated glass fiber mat will shrink, melt and then disintegrate in 10 minutes, the asphalt will readily ignite, burn intensely and release large quantities of smoke, and the intumescable granules will intumesce and melt.

What is claimed is:

1. A fire- and heat-resistant sheet material comprising
   at least two fibrous webs formed from a material that does not ignite or soften at temperatures lower than about 150° C.;
   asphalt disposed between, impregnated in, and adhering the fibrous webs together;
   inorganic filler particles dispersed in the asphalt in a volume ratio between about 1:10 and 1:1 particles to asphalt;

intumescable granules dispersed in the asphalt in an amount of at least about 5 volume-parts per 100 parts of asphalt; and iron- and halogen-containing material dispersed in the asphalt and which catalyzes the charring of asphalt upon heating of the asphalt to 175° C. or more.

2. Sheet material of claim 1 in which the fibrous webs comprise glass-fiber mats.

3. Sheet material of claim 1 or 2 in which the iron- and halogen-containing material is coated on the intumescable granules.

4. Sheet material of claim 1 in which the iron- and halogen-containing material comprises halogenated organic compound that releases halogen when heated to a temperature less than 175° C., and an iron-containing compound adapted to react with said released halogen to form iron halide, which catalyzes the charring of asphalt.

5. Sheet material of claim 4 in which the halogenated organic compound comprises chlorinated paraffin.

6. Sheet material of claim 4 or 5 in which the iron-containing compound comprises iron oxide.

7. Sheet material of claim 1 or 2 in which the inorganic filler particles are selected from calcium carbonate, titanium oxide, zirconium oxide, and clay.

8. Sheet material of claim 1 in which the intumescable granules comprise hydrated soluble silicate.

9. Sheet material of claim 1 in which the intumescable granules have been intumesced to yield an expanded insulative panel.

10. A fire- and heat-resistant sheet material comprising at least two glass-fiber webs;

asphalt disposed between, impregnated in, and adhering the glass-fiber webs together;

inorganic filler particles dispersed in the asphalt in a volume ratio between about 1:10 and 1:1 particles to asphalt; and intumescable granules comprising hydrated soluble silicate glass dispersed in the asphalt in an amount of at least 10 volume-parts per 100 parts of asphalt; said granules being coated with a halogenated organic compound that releases halogen when heated to a temperature less than 175° C., and an iron-containing compound adapted to react with said released halogen to form iron halide, which catalyzes the charring of asphalt upon heating of the asphalt to 175° C. or more.

11. Sheet material of claim 10 in which the hydrated soluble silicate glass comprises sodium silicate.

12. Sheet material of claim 10 in which the halogenated organic compound comprises chlorinated paraffin.

13. Sheet material of claim 10 or 12 in which the iron-containing compound comprises iron oxide.

14. Sheet material of claim 10 in which the inorganic filler particles are included in an amount of at least 2 volume-parts per 10 parts of asphalt.

* * * * *